Feb. 26, 1952 — C. K. MOUSEL — 2,587,197
COOLING SYSTEM FOR MOTOR VEHICLES
Filed April 5, 1948 — 2 SHEETS—SHEET 1
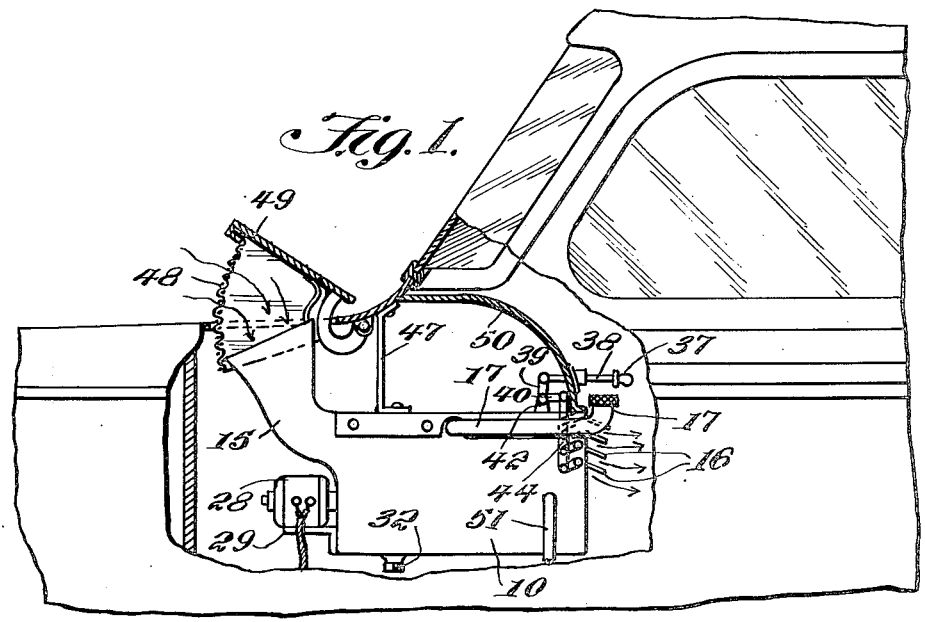
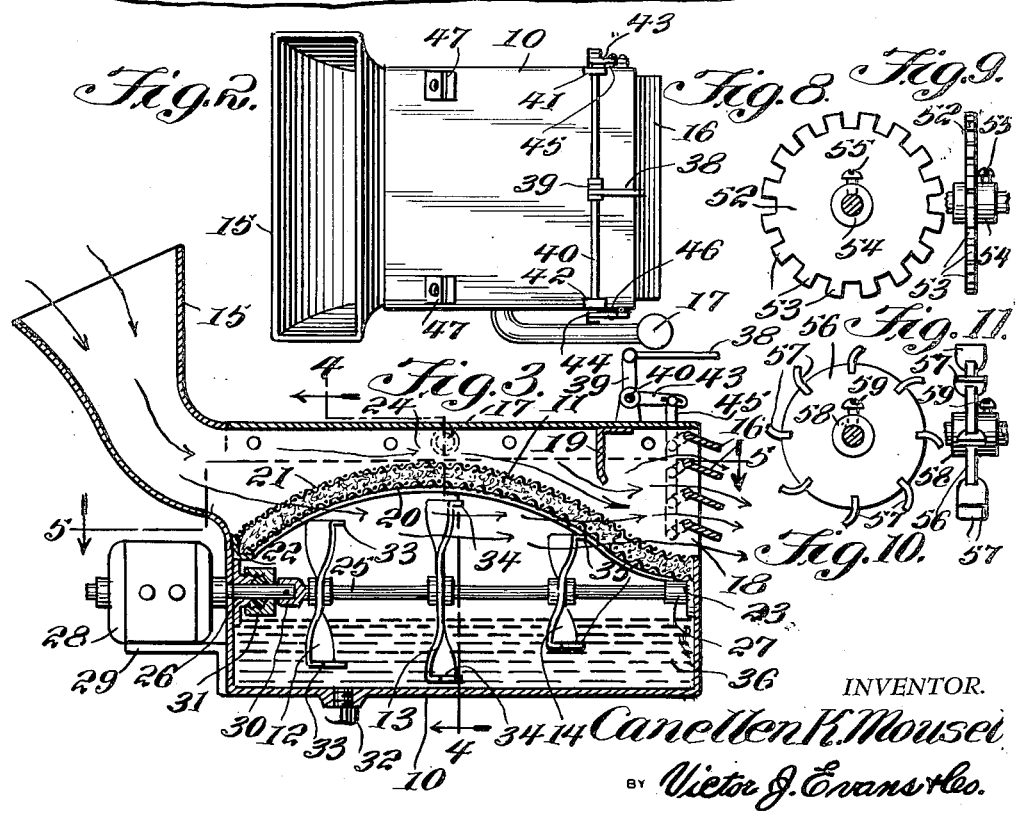
INVENTOR.
Canellen K. Mousel
BY Victor J. Evans & Co.
ATTORNEYS Feb. 26, 1952     C. K. MOUSEL     2,587,197
COOLING SYSTEM FOR MOTOR VEHICLES
Filed April 5, 1948     2 SHEETS—SHEET 2
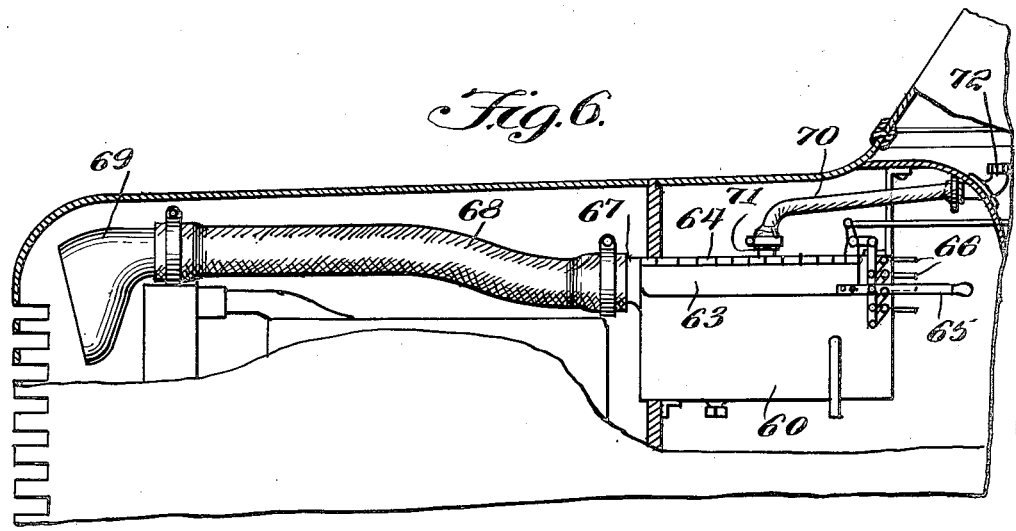
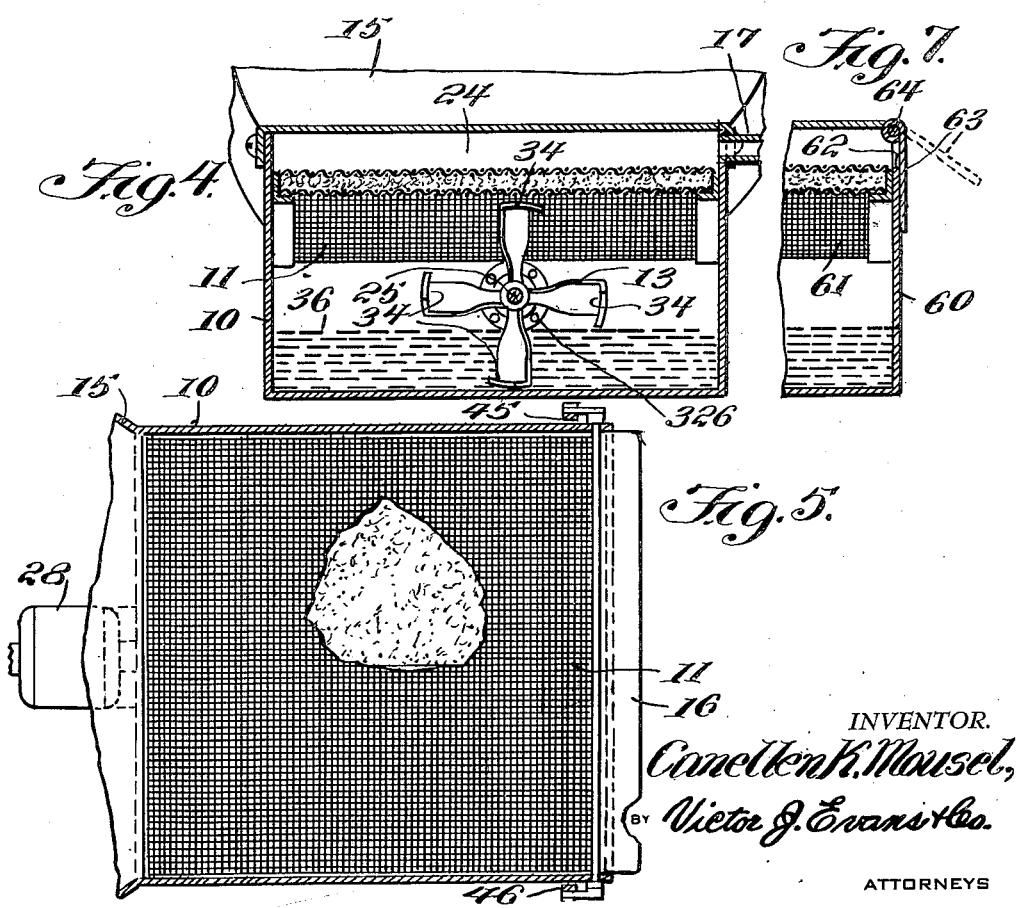
INVENTOR.
Conellen K. Mousel,
BY Victor J. Evans & Co.
ATTORNEYS Patented Feb. 26, 1952

2,587,197

UNITED STATES PATENT OFFICE 2,587,197

COOLING SYSTEM FOR MOTOR VEHICLES

Canellen K. Mousel, Edison, Nebr.

Application April 5, 1948, Serial No. 19,068

1 Claim. (Cl. 261—92)

This invention relates to cooling systems for motor vehicles wherein air is forced through a spray of water or a saturated fibrous baffle, and in particular a comparatively small casing or tank preferably positioned under the cowl or forward part of the vehicle with an inlet connection at the forward end and a discharge opening with baffles therein at the rear and the interior of the casing is provided with a horizontally disposed arcuate fibrous baffle with rotating impellers positioned under the baffle and dipping into water in the lower part of the casing.

The purpose of this invention is to provide a comparatively small air conditioning unit adapted to be installed in a motor vehicle through which air may be forced into the vehicle for cooling the interior thereof.

Various devices have been provided for cooling motor vehicles and some have passed or forced the air through a spray of water, but for efficient cooling it has been found desirable to condense the elements into a comparatively small unique housing with impellers therein and form the interior of the housing so that the air will be drawn through a saturated fibrous baffle at the entrance end and discharged through the same baffle as it leaves the housing and passes into the vehicle body.

The object of this invention is, therefore, to provide a small air conditioning unit for motor vehicles in which air is drawn into and discharged through a fibrous baffle saturated with water.

Another object of the invention is to provide a small air conditioning housing for motor vehicles having a horizontally disposed bulging water saturated fibrous baffle with impellers for drawing air in through the baffle and for discharging the air through the same baffle in which means is provided for choking the air down and forcing it into or in close contact with the baffle.

A further object of the invention is to provide a cooling system for motor vehicles wherein air is forced through a spray of water or through a saturated fibrous baffle as it enters the vehicle which is of a simple and economical construction.

With these and other objects and advantages in view the invention consists of the new and novel combination, construction, and arrangement of parts as hereinafter more fully described, set forth in the claim appended hereto, and disclosed in the accompanying drawings forming part hereof, wherein:

Figure 1 is a view showing a side elevation of the formed part of a motor vehicle of the pleasure type with part broken away showing the air cooling unit installed therein.

Figure 2 is a plan view showing the air cooling unit separated from the vehicle.

Figure 3 is a vertical longitudinal section through the cooling unit showing the relative positions of the parts.

Figure 4 is a cross section through the unit taken on line 4—4 of Figure 3, with parts broken away.

Figure 5 is a sectional plan through the unit taken on line 5—5 of Figure 3 with parts broken away.

Figure 6 is a view similar to that shown in Figure 1 illustrating a modification in the installation wherein the inlet tube extends to the front of the radiator hood and the filling connection extends from the upper surface of the unit.

Figure 7 is a detail showing a section through one side of the unit showing shutters or baffles at the sides, and with part broken away.

Figure 8 is a detail showing a modification wherein a toothed disc is provided to throw water upward into the fibrous baffle or pad.

Figure 9 is a view showing a side elevation of the disc shown in Figure 8.

Figure 10 shows a further modification wherein a disc with paddles on the periphery is provided to throw water to the baffle.

Figure 11 is a view showing a side elevation of the disc shown in Figure 10.

Referring now to the drawings wherein like reference characters denote corresponding parts the motor vehicle cooling system of this invention includes a casing 10 with an arcuate horizontally disposed baffle 11, impellers 12, 13, and 14, below the baffle, an inlet connection 15, shutters for deflecting the air at the outlet end as indicated by the numeral 16, and a filling spout 17.

In the design shown in Figures 1 to 3, inclusive, the casing 10 is substantially rectangular-shaped with the inlet connection 15 extending at one end and with an outlet opening 18, in which the shutters 16 are positioned, at the other. Intermediate of the ends is a downwardly extending baffle 19 which chokes the air down deflecting it toward the baffle 11. The baffle 11, which is formed with a lower screen 20 and an upper screen 21 with excelsior or the like between the screens slopes upward from a supporting angle 22 at the forward end, and then downward to the support 23 at the rear, providing a relatively small area 24 intermediate of the ends so that the air is urged toward the baffle.

The impellers 12, 13 and 14 are mounted on a shaft 25 which is journaled in bearings 26 and 27 in the lower part of the casing, and the shaft is rotated by a motor 28 that is supported at the end of the casing on a bracket 29. The shaft is provided with a coupling 30 and a packing gland 31 is provided on the inner end of the bearing 26. The bottom of the casing is provided with a drain plug 32, as shown.

The blades of the impellers are provided with cup-shaped lips 33, 34, and 35 at the outer ends which pick up water 36 in the lower part of the casing and throw it upward against the pad or baffle 11 and at the same time forming a spray wherein air passing therethrough will be cooled and at the same time moistened. Water may be supplied to the casing through a filling spout 17, as shown.

The position of the shutters 16 may be controlled by a knob 37 in the vehicle which is connected by a rod 38 to an arm 39 of a rod 40 that is pivotally mounted in ears 41 and 42 on the casing and provided with arms 43 and 44 at the ends which actuate the shutters through vertically disposed bars 45 and arms 46, as illustrated in Figure 3.

In the design shown in Figure 1 the casing is supported by brackets 47 and positioned so that the inlet 15 registers with the screen 48 of the air intake baffle 49 of the vehicle, as shown. In this position the filling spout 17 extends under the instrument board 50 and the knob 37 for controlling the position of the shutters 16 will extend through the board. A drain connection 51 may also be provided to prevent overflow of water from the casing and to limit the level of the water therein.

The impellers may also be made as illustrated in Figures 8 and 10, and in Figure 8 a disc 52 with teeth 53 in the outer edge is provided with a hub 54 having a set screw 55 therein, and in Figure 10 a disc 56 is provided with paddles 57 and this is also provided with a hub 58 with a set screw 59. It will be understood that impellers or wheels of any suitable type may be used in the casing to throw the water into the pad.

In Figures 6 and 7 the cooling unit is formed with a casing 60 having a horizontally disposed baffle 61 similar to the baffle 11 and in this design the casing is provided with openings 62 along the upper edges of the sides, and shutters 63 supported at the upper corners of the casing by hinges 64, may be provided to close the openings 62 or adjust the area thereof. The shutters may be provided with arms 65 for adjusting the positions thereof. The end of the casing may also be provided with shutters 66 similar to the shutters 16 shown in Figure 3.

In the design shown in Figure 6 the casing is provided with an air inlet nipple 67 at the forward end which is connected to a hose 68 and the forward end of the hose is provided with an air intake 69. A water filling spout 70 is also provided which extends from a connection 71 in the top of the casing through the instrument board where a filling cap 72 may be provided as shown.

With the interior of the casing formed as illustrated in Figure 3 air will be drawn in through the inlet 15 and forced through the pad or baffle 11 and also through a spray of water wherein it will be cooled and the cool air will then be discharged into the interior of the vehicle.

It will be understood that other modifications may be made in the design or arrangement of the parts without departing from the spirit of the invention.

What is claimed is:

In an air conditioning unit for motor vehicles, the combination which comprises a rectangular shape substantially enclosed box-like housing having a water compartment in the lower part, an air inlet connection in one end of the housing and an outlet opening in the opposite end, a horizontally disposed baffle having an upwardly bowed intermediate section extended across the said housing positioned substantially midway of the height thereof, said baffle including fibrous material positioned between wire mesh and the high point of the said upwardly bowed section thereof being spaced from the upper surface of the housing providing a constricted area at a point midway between the inlet connection and outlet opening whereby air passing through the housing is forced through the said baffle, a transverse baffle extended downwardly from the upper surface of the housing and positioned between the high point of the baffle and outlet opening, a longitudinally disposed shaft having impellers thereon journaled in the housing and positioned below the said horizontally disposed baffle, means rotating the said shaft, a filling tube extended from the housing to a point in the vehicle, and means regulating the area of the said outlet opening of the housing.

CANELLEN K. MOUSEL.

REFERENCES CITED

The following references are of record in the file of this patent:

UNITED STATES PATENTS

| Number | Name | Date |
|---|---|---|
| 1,755,733 | Hagar et al. | Apr. 22, 1930 |
| 2,060,732 | Hopkins et al. | Nov. 10, 1936 |
| 2,175,779 | Mohrdieck | Oct. 10, 1939 |
| 2,233,976 | Essick | Mar. 4, 1941 |
| 2,243,839 | Dalton | June 3, 1941 |
| 2,428,842 | Feinberg | Oct. 14, 1947 |

FOREIGN PATENTS

| Number | Country | Date |
|---|---|---|
| 533,501 | France | Dec. 14, 1921 |